United States Patent
Wang et al.

(10) Patent No.: US 12,507,339 B2
(45) Date of Patent: Dec. 23, 2025

(54) HEAT DISSIPATION MODULE

(71) Applicant: ASUSTek COMPUTER INC., Taipei (TW)

(72) Inventors: Kuan-Chuan Wang, Taipei (TW); Yi-Hong Lin, Taipei (TW); Chin-Chuan Wu, Taipei (TW); Wei-Chia Liao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 186 days.

(21) Appl. No.: 18/531,714

(22) Filed: Dec. 7, 2023

(65) Prior Publication Data
US 2025/0133649 A1     Apr. 24, 2025

(30) Foreign Application Priority Data
Oct. 20, 2023 (TW) ................. 112140238

(51) Int. Cl.
*H05K 1/02* (2006.01)
*H05K 7/20* (2006.01)

(52) U.S. Cl.
CPC ......... *H05K 1/0203* (2013.01); *H05K 7/2039* (2013.01)

(58) Field of Classification Search
CPC ........................... H05K 1/0203; H05K 7/2039
USPC ....................................................... 361/715
See application file for complete search history.

(56) References Cited

U.S. PATENT DOCUMENTS

| | | | | |
|---|---|---|---|---|
| 5,329,436 A | * | 7/1994 | Chiu | G03B 21/2026 318/368 |
| 6,134,115 A | * | 10/2000 | Sim | G06F 1/184 361/728 |
| 6,137,683 A | * | 10/2000 | Lee | F28D 15/0266 361/679.48 |
| 6,366,463 B2 | * | 4/2002 | Hamano | G06F 1/203 361/689 |
| 6,587,342 B1 | * | 7/2003 | Hsu | G06F 1/20 415/213.1 |
| 7,054,155 B1 | * | 5/2006 | Mease | H05K 7/20581 165/104.34 |

(Continued)

FOREIGN PATENT DOCUMENTS

| | | |
|---|---|---|
| CN | 112397106 | 2/2021 |
| CN | 216927523 | 7/2022 |

(Continued)

*Primary Examiner* — Anatoly Vortman
(74) *Attorney, Agent, or Firm* — JCIPRNET

(57) ABSTRACT

A heat dissipation module is adapted for being installed on a circuit board. The heat dissipation module includes a fixed base and a heat dissipating device. One end of the fixed base is adapted for being fixed to the circuit board, and the other end has a rotating component. The rotating component is pivoted on the fixed base along a rotation axis. The heat dissipation device includes a heat dissipation body and an alignment member extending from the heat dissipation body, and the alignment member is adapted to be detachably connected to the rotating component. When the heat dissipation device is connected to the rotating component through the alignment member, the heat dissipation body is adapted to flip relative to the fixed base along the rotating axis.

9 Claims, 8 Drawing Sheets

(56) References Cited

U.S. PATENT DOCUMENTS

| | | | | |
|---|---|---|---|---|
| 7,177,156 B2* | 2/2007 | Yatskov | | G06F 1/20 |
| | | | | 257/E23.083 |
| 7,580,259 B2* | 8/2009 | Hsiao | | G06F 1/20 |
| | | | | 361/679.48 |
| 7,719,830 B2* | 5/2010 | Howarth | | G06F 1/1632 |
| | | | | 361/679.56 |
| 7,753,107 B2* | 7/2010 | Zhou | | H01L 23/467 |
| | | | | 257/722 |
| 7,782,613 B2* | 8/2010 | Harris | | G06F 1/206 |
| | | | | 165/122 |
| 7,821,788 B2* | 10/2010 | Hsiao | | G06F 1/20 |
| | | | | 361/679.48 |
| 7,916,471 B2* | 3/2011 | Miyamoto | | G11B 33/142 |
| | | | | 361/679.48 |
| 8,064,199 B2* | 11/2011 | Lin | | H05K 7/20172 |
| | | | | 361/679.48 |
| 8,322,405 B2* | 12/2012 | Tang | | H01L 23/467 |
| | | | | 361/679.48 |
| 8,351,205 B2* | 1/2013 | Tang | | F04D 25/0613 |
| | | | | 361/679.48 |
| 8,422,226 B2* | 4/2013 | Ye | | G06F 1/20 |
| | | | | 361/695 |
| 8,451,605 B2* | 5/2013 | Chen | | H05K 7/20172 |
| | | | | 361/679.48 |
| 8,625,276 B2* | 1/2014 | Chen | | G06F 1/20 |
| | | | | 361/679.48 |
| 10,802,553 B1* | 10/2020 | Chang | | G06F 1/184 |
| 10,955,881 B2* | 3/2021 | Gopalakrishna | | H01L 23/4093 |
| 2004/0121719 A1* | 6/2004 | Robison | | B60H 1/00478 |
| | | | | 454/143 |
| 2008/0041561 A1* | 2/2008 | Zhou | | H01L 23/467 |
| | | | | 257/E23.099 |
| 2008/0101021 A1* | 5/2008 | Sanchez | | F04D 29/601 |
| | | | | 361/695 |
| 2023/0225086 A1 | 7/2023 | Wu | | |

FOREIGN PATENT DOCUMENTS

| | | |
|---|---|---|
| TW | M632492 | 9/2022 |
| TW | 202329796 | 7/2023 |

* cited by examiner

HEAT DISSIPATION MODULE

CROSS-REFERENCE TO RELATED APPLICATION

This application claims the priority benefit of Taiwan application serial no. 112140238, filed on Oct. 20, 2023. The entirety of the above-mentioned patent application is hereby incorporated by reference herein and made a part of this specification.

BACKGROUND

Technical Field

The application relates to a heat dissipation module.

Description of Related Art

Currently, in order to dissipate heat for an expansion card installed on a circuit board, a heat dissipating device is usually locked next to the expansion card so that the heat of the expansion card can be transferred to the heat dissipating device. However, such a fixation method is difficult to disassemble and assemble quickly. In addition, when there are many components on the circuit board, it is more difficult to align and install the heat dissipating device.

SUMMARY

The present invention provides a heat dissipation module that can be quickly aligned to complete installation or disassembly.

A heat dissipation module of the present invention is adapted for being installed on a circuit board. The heat dissipation module includes a fixed base and a heat dissipating device. One end of the fixed base is adapted for being fixed to the circuit board, and the other end has a rotating component. The rotating component is pivoted on the fixed base along a rotation axis. The heat dissipation device includes a heat dissipation body and an alignment member extending from the heat dissipation body, and the alignment member is adapted to be detachably connected to the rotating component. When the heat dissipation device is connected to the rotating component through the alignment member, the heat dissipation body is adapted to flip relative to the fixed base along the rotating axis.

Based on the above, the fixed base of the heat dissipation module of the present invention is adapted for being fixed to the circuit board. The rotating component is pivoted on the fixed base. The alignment member of the heat dissipating device of the heat dissipation module is detachably inserted into the rotating component, so that the heat dissipation body of the heat dissipating device rotates with the rotating component relative to the fixed base. Since the alignment member is inserted into the rotating component, the alignment is completed. And the alignment member is flipped, the installation is completed. Therefore, it is quite easy to assemble. Since no tools are required, the convenience of disassembly and assembly is greatly increased.

DESCRIPTION OF THE EMBODIMENTS

Figure 1A:
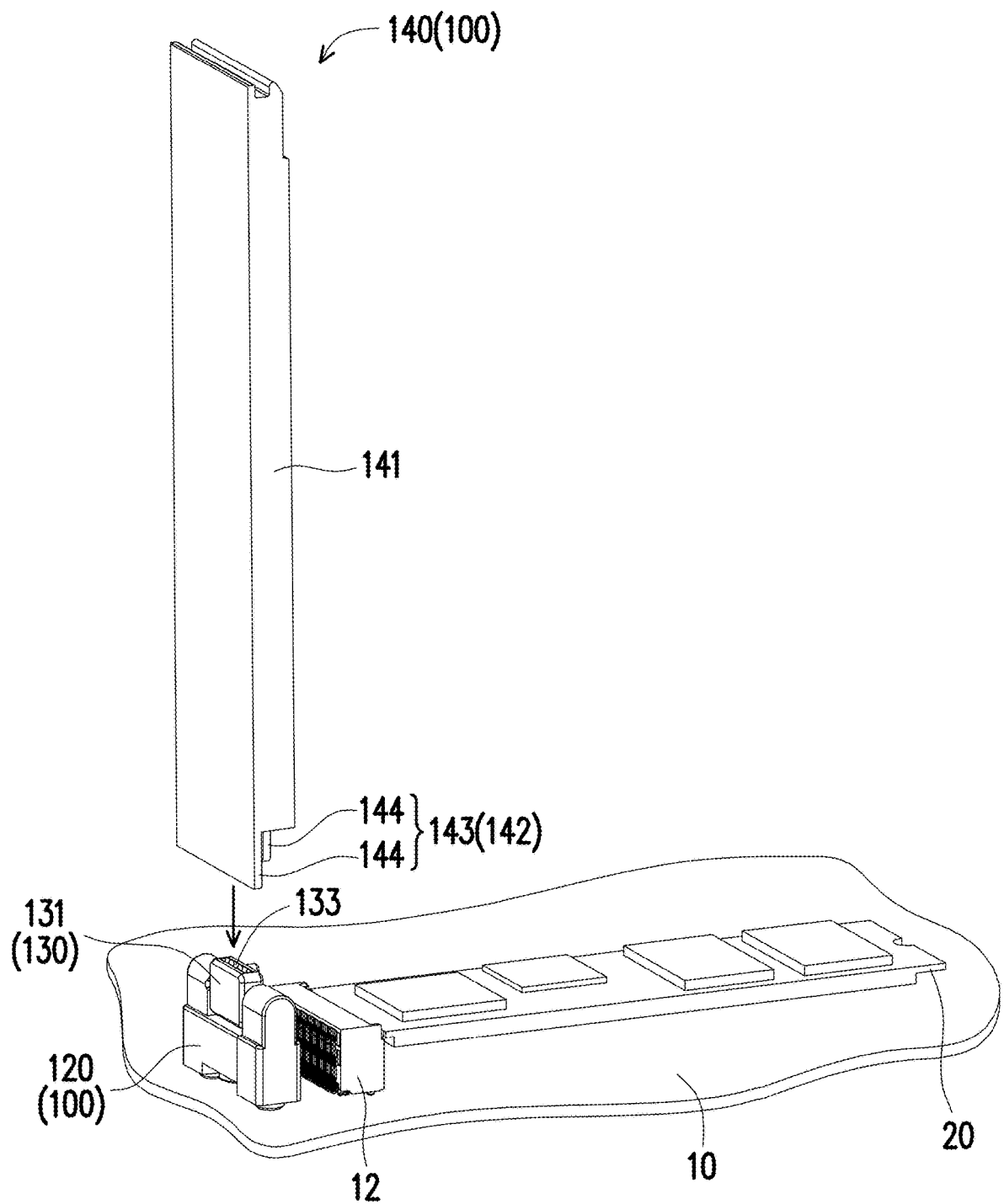
FIG. 1A is a schematic diagram of a heat dissipating device of a heat dissipation module that has not yet been inserted into a fixed base on a circuit board according to an embodiment of the present invention.
Figure 1B:
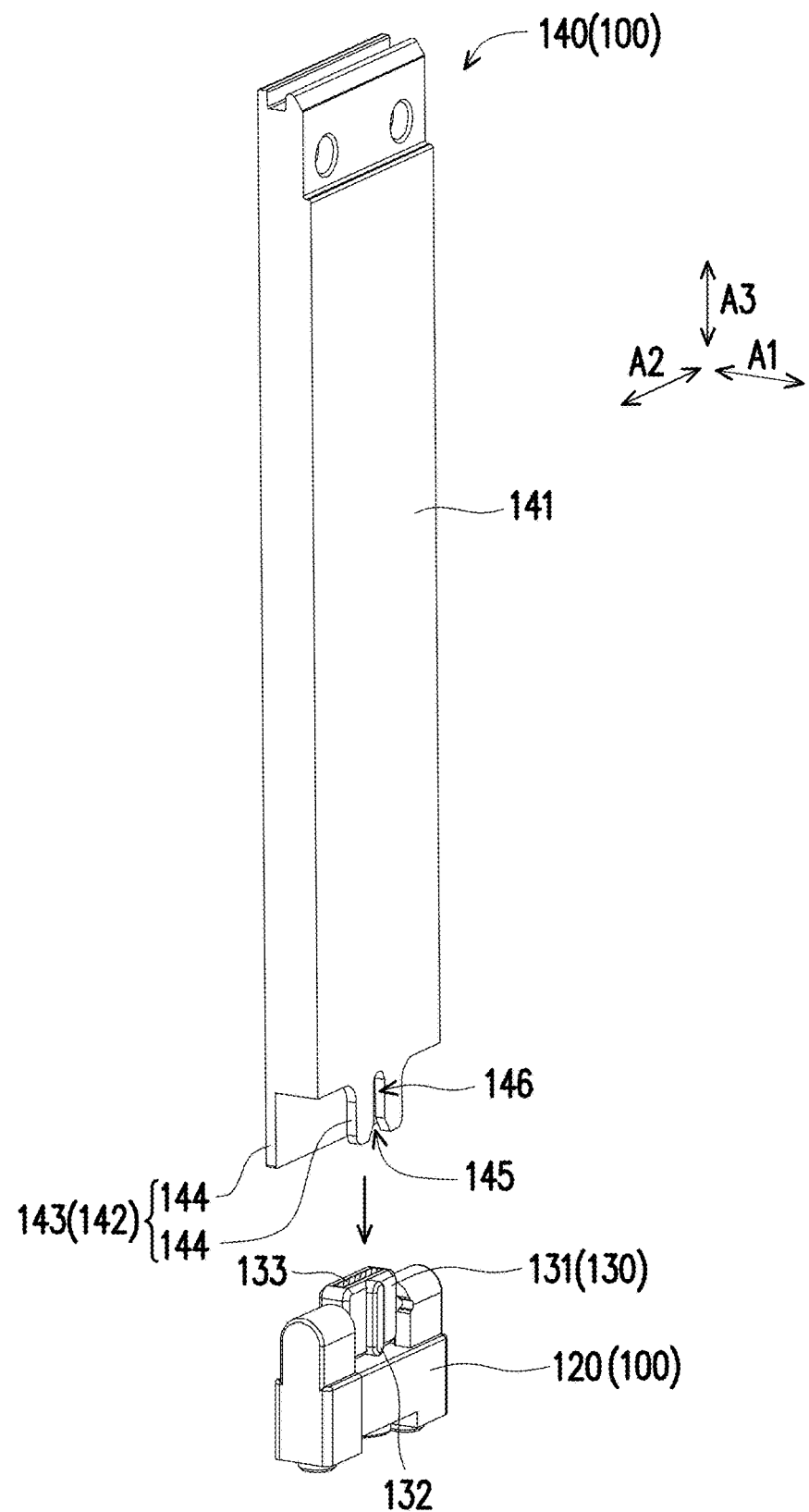
FIG. 1B is another perspective view of the heat dissipating device of the heat dissipation module of FIG. 1A that has not yet been inserted into the fixed base.
Figure 2:
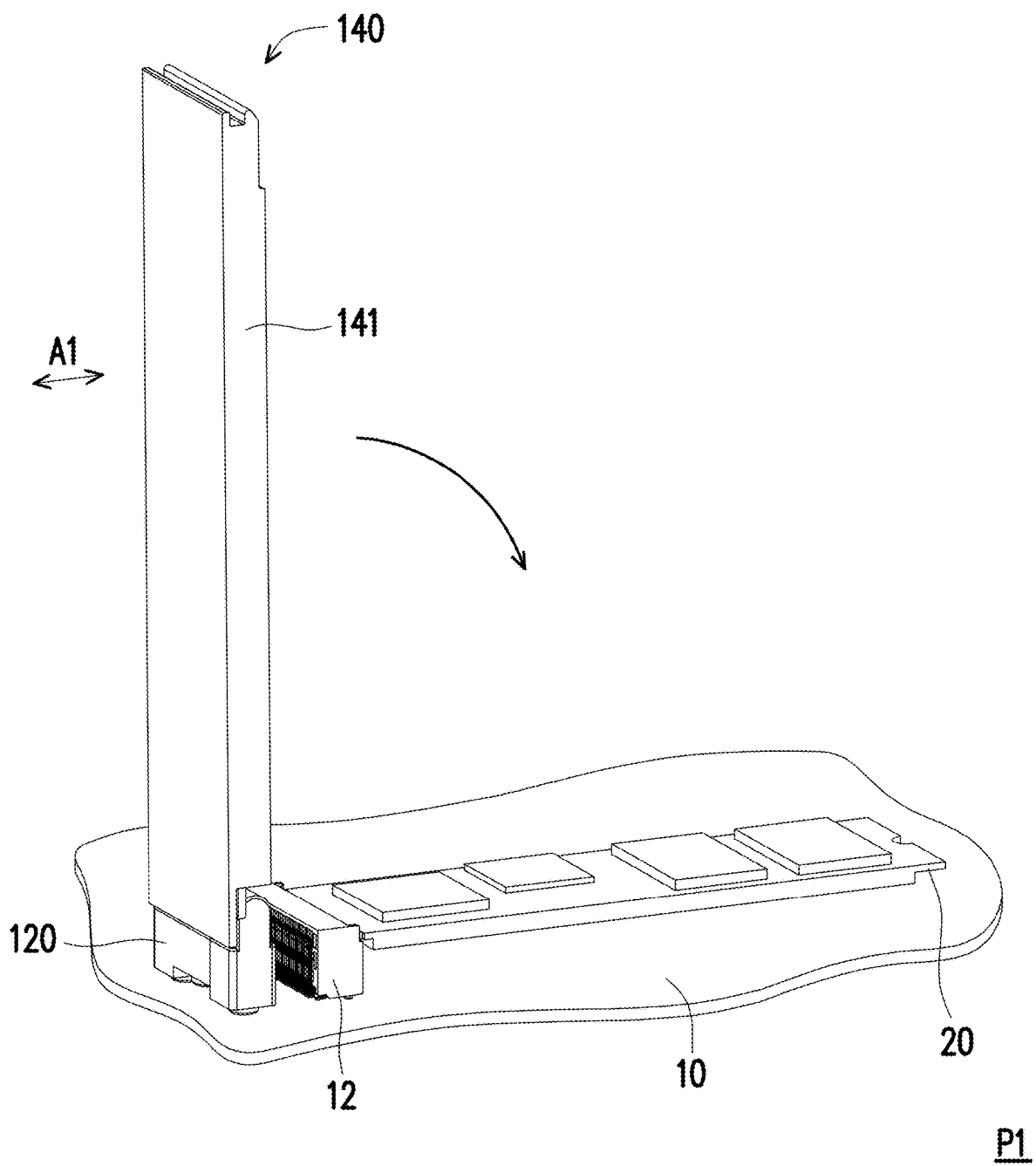
FIG. 2 is a schematic diagram of the heat dissipating device of the heat dissipation module of FIG. 1A being inserted into the fixed base on the circuit board and located in a plug-in position.
Figure 3:
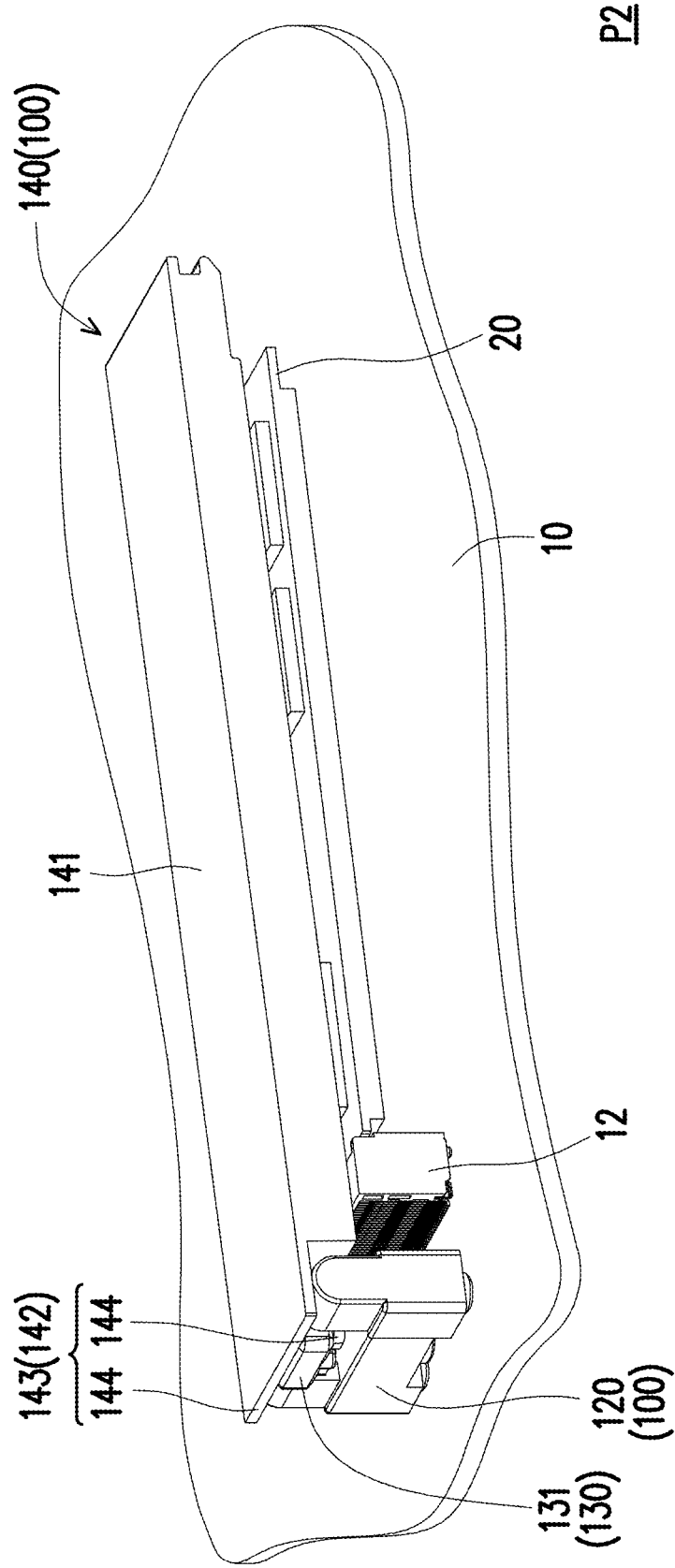
FIG. 3 is a schematic diagram of the heat dissipating device of the heat dissipation module of FIG. 1A located at a heat dissipation position.

FIG. 1A is a schematic diagram of a heat dissipating device of a heat dissipation module that has not yet been inserted into a fixed base on a circuit board according to an embodiment of the present invention. FIG. 1B is another perspective view of the heat dissipating device of the heat dissipation module of FIG. 1A that has not yet been inserted into the fixed base. FIG. 2 is a schematic diagram of the heat dissipating device of the heat dissipation module of FIG. 1A being inserted into the fixed base on the circuit board and located in a plug-in position. FIG. 3 is a schematic diagram of the heat dissipating device of the heat dissipation module of FIG. 1A located at a heat dissipation position. It should be noted that for the sake of simplicity, FIG. 1B hides the circuit board, slots and expansion cards.

Referring to FIG. 1A to FIG. 3, the heat dissipation module 100 of the embodiment is adapted for being installed on a circuit board 10 (FIG. 1A). The circuit board 10 is provided with a slot 12, and the slot 12 is for an expansion card 20 to be inserted. In the embodiment, the circuit board 10 is, for example, a motherboard, the slot 12 is, for example, an M.2 slot, and the expansion card 20 is, for example, a solid-state drive with an M.2 interface. However, the types of the circuit board 10, the slot 12 and the expansion card 20 are not limited thereto.

Since the expansion card 20 will generate high heat during operation, the heat dissipation module 100 of the embodiment can provide good heat dissipation for the expansion card 20, and is quite convenient in alignment and assembly. This will be described as follows.

In the embodiment, the heat dissipation module 100 includes a fixed base 120 and a heat dissipating device 140. One end of the fixed base 120 is located on the circuit board 10 next to the slot 12, and the other end has a rotating component 130. The rotating component 130 is pivoted on the fixed base 120 along a rotation axis 135.

The heat dissipating device 140 includes a heat dissipation body 141 and an alignment member 142 extending from the heat dissipation body 141. The alignment member 142 is located at one end of the heat dissipating device 140. The alignment member 142 is detachably connected to the rotating component 130.

As shown in FIG. 1B, the alignment member 142 and the rotating component 130 are connected by a concave component and a convex component. Specifically, the rotating component 130 is a convex component 131, the alignment member 142 is a concave component 143. In the embodiment, the concave component 143 includes two tongue pieces 144 arranged in parallel, the convex component 131 is sandwiched by the two tongue pieces 144 of the concave component 143 to limit the movement of the alignment member 142 relative to the rotating component 130 on a first axis A1. Certainly, in other embodiments, the alignment member 142 may also be the concave component, and the rotating component 130 may be the convex component, which is not limited thereto.

Furthermore, the rotating component 130 further includes a protrusion 132. In the embodiment, the protrusion 132 protrudes from the convex component 131, but the position of the protrusion 132 is not limited thereto. The alignment member 142 includes a groove 146 corresponding to the protrusion 132.

In the embodiment, the groove 146 is formed on one of the two tongue pieces 144. The cooperation of the protrusion 132 and the groove 146 is used to limit the movement of the alignment member 142 relative to the rotating component 130 on a second axis A2, and the second axis A2 is perpendicular to the first axis A1.

Therefore, after the alignment member 142 is docked with the rotating component 130, the heat dissipation body 141 can flip between a plug-in position P1 (FIG. 2) and a heat dissipation position P2 (FIG. 3) relative to the fixed base 120 along with the rotating component 130. When the heat dissipation body 141 is located at the heat dissipation position P2, the heat dissipation body 141 is thermally coupled to the expansion card 20 to dissipate heat from the expansion card 20.

In the embodiment, since the alignment member 142 is inserted into the rotating component 130, the alignment is completed, and the alignment member 142 is rotated to the heat dissipation position P2, the installation is completed, so the assembly is quite convenient. Besides, when the alignment member 142 rotates to the plug-in position P1 and is pulled out from the rotating component 130, the disassembly is completed, so the disassembly is quite convenient. No tools are needed for disassembly and assembly, which greatly increases the convenience of disassembly and assembly.

In addition, in the embodiment, since the slot 12 is located between the fixed base 120 and the expansion card 20, when the heat dissipation body 141 is located at the heat dissipation position P2, the projection of the heat dissipation body 141 on the circuit board 10 covers the slot 12 to make the appearance simpler.

Figure 4A:
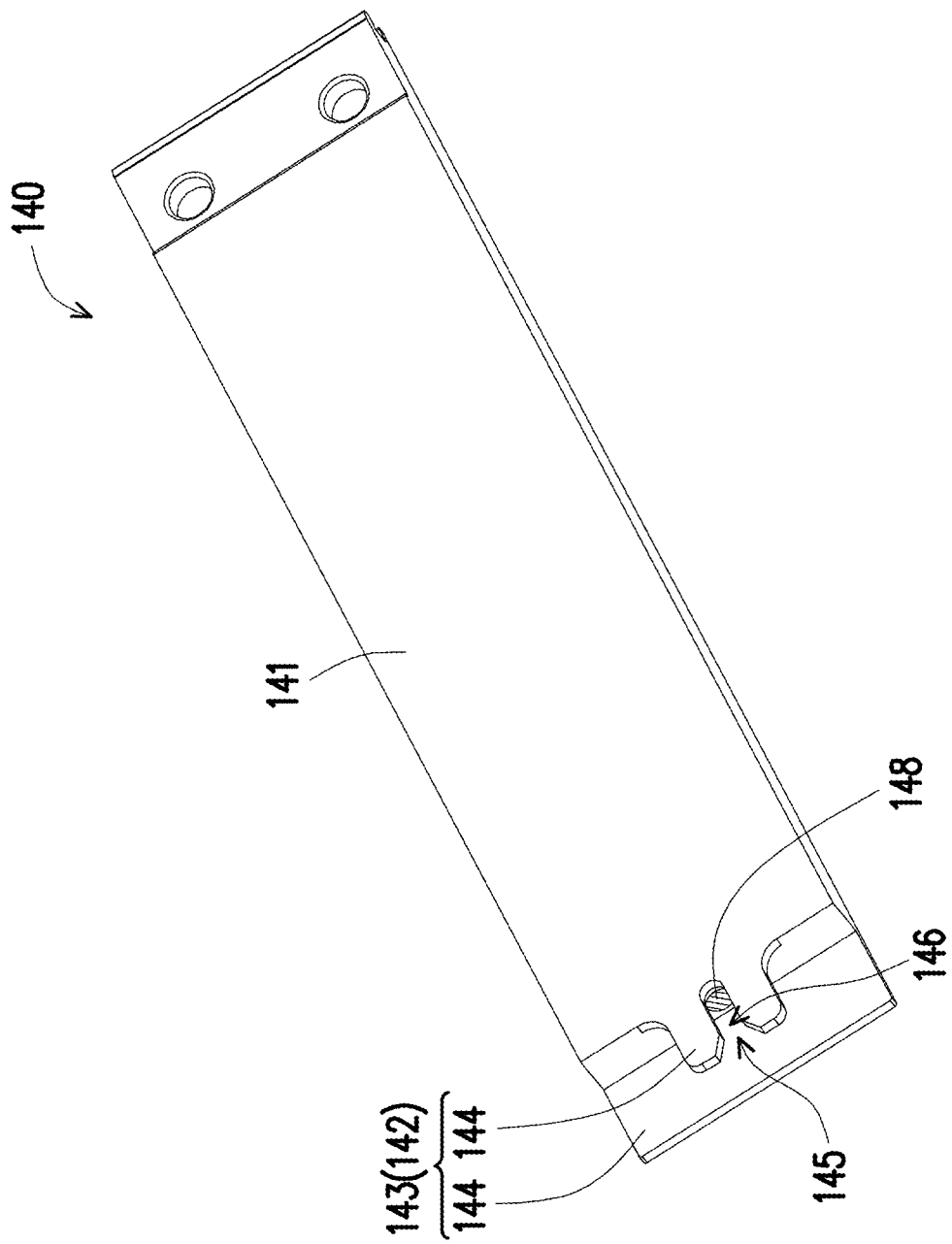
FIG. 4A and FIG. 4B are schematic diagrams of the heat dissipating device of FIG. 1A from different perspectives.
Figure 4B:
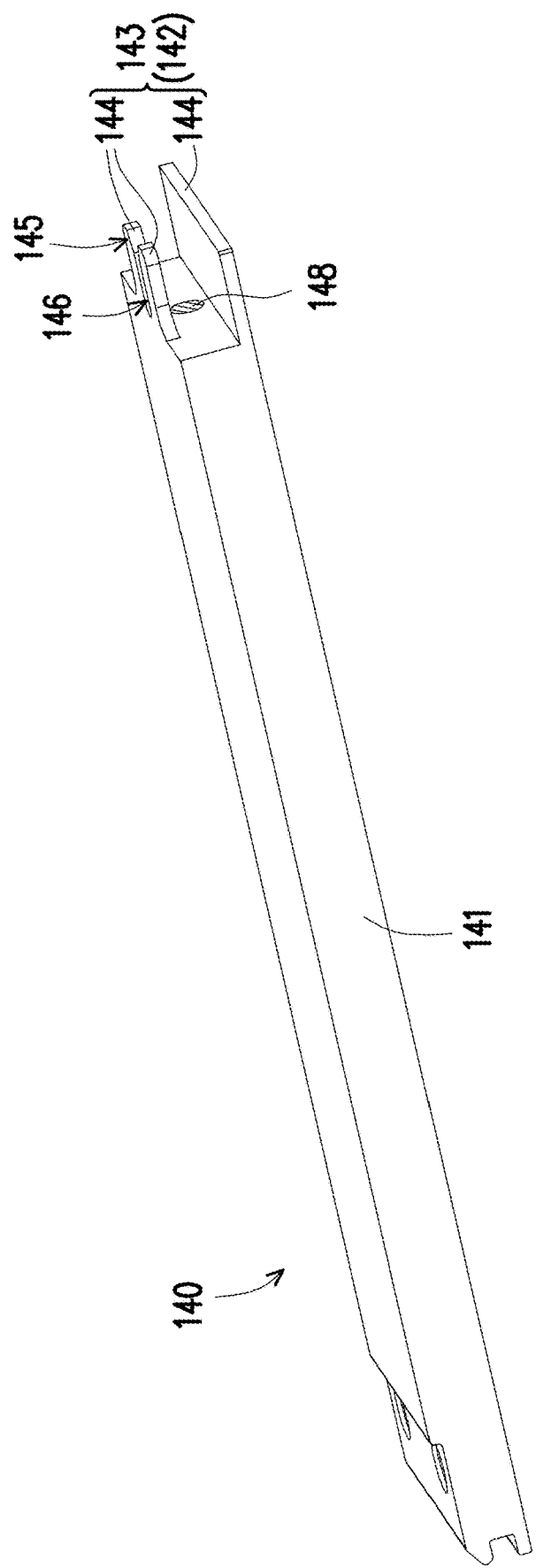

FIG. 4A and FIG. 4B are schematic diagrams of the heat dissipating device of FIG. 1A from different perspectives. Referring to FIG. 4A, in the embodiment, the tongue piece 144 having the groove 146 further includes a tapered groove 145, the tapered groove 145 is indented on the edge of the tongue piece 144 away from the heat dissipation body 141. The tapered groove 145 is connected to the groove 146, and the minimum width of the tapered groove 145 is equal to the width of the groove 146. Since the opening of the tapered groove 145 away from the groove is wider, the groove wall at the opening can be used to guide the protrusion, so that the protrusion can smoothly enter the groove 146.

Referring to FIG. 1B and FIG. 4B, in the embodiment, the rotating component 130 optionally includes a first magnetic component 133 (FIG. 1B), the heat dissipating device 140 optionally includes a second magnetic component 148 (FIG. 4B) corresponding to the first magnetic component 133. The second magnetic component 148 is located next to the alignment member 142. When the alignment member 142 is close to the rotating component 130, the second magnetic component 148 will be magnetically attracted by the first magnetic component 133, so that the alignment member 142 and the rotating component 130 can complete alignment and assembly more quickly. Besides, the design of the first magnetic component 133 and the second magnetic component 148 helps the heat dissipating device 140 to be fixed more firmly relative to the rotating component 130 on a third axis A3 (FIG. 1B).

Figure 5:
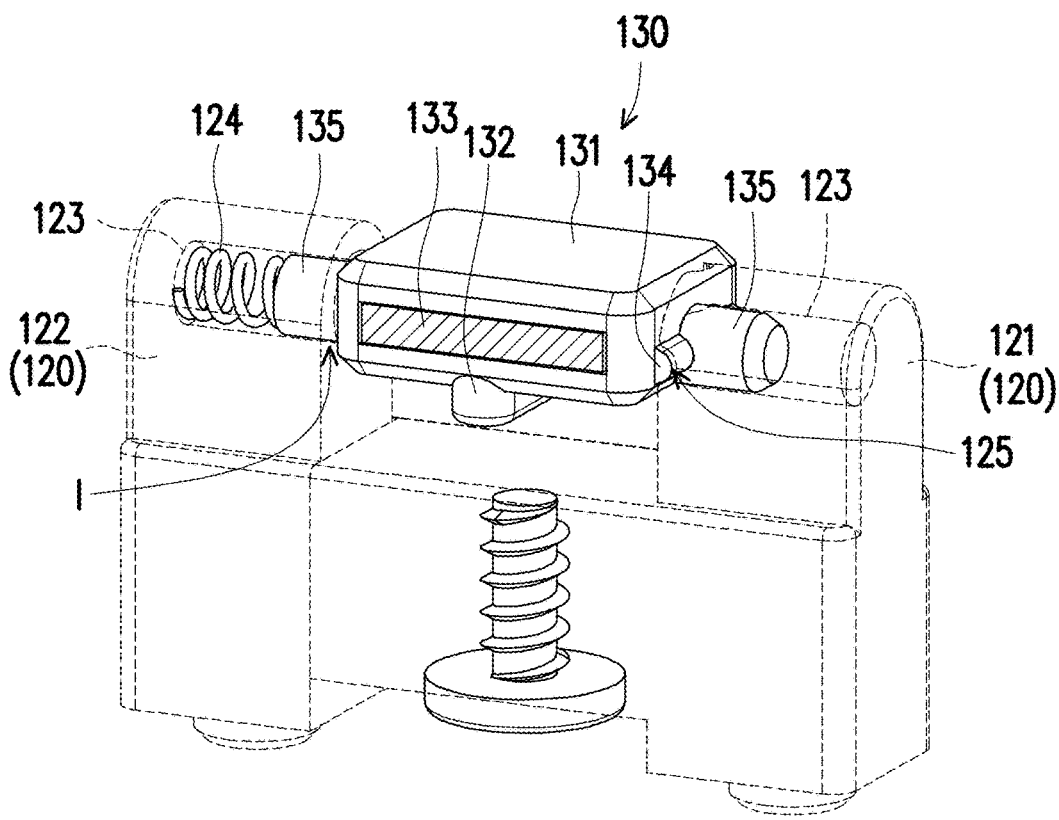
FIG. 5 is a perspective view of the fixed base of FIG. 1A.

FIG. 5 is a perspective view of the fixed base of FIG. 1A. Referring to FIG. 5, in the embodiment, the fixed base 120 includes a first base 121 and a second base 122 fixed to each other. The first base 121 and the second base 122 can be fixed by screws, but the fixing method of the first base 121 and the second base 122 is not limited thereto. In other embodiments, the fixed base 120 may also be a single structure. The rotation axis 135 of the rotating component 130 protrudes from the convex component 131, and the rotation axis 135 is pivoted to a pivot hole 123 of the first base 121 and the second base 122.

Figure 6:
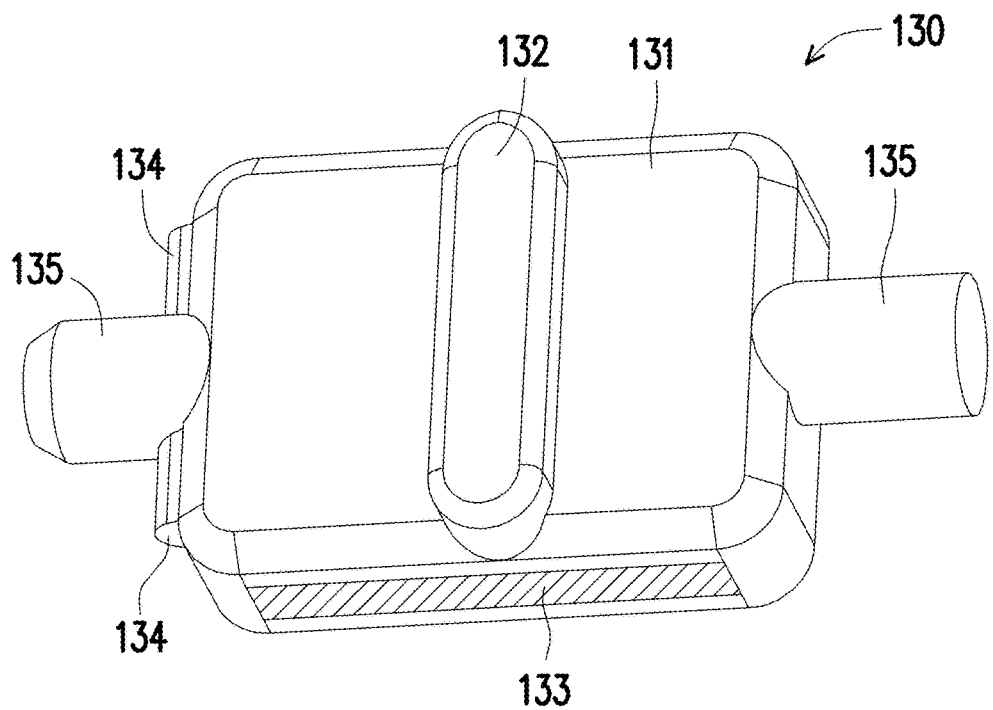
FIG. 6 is a schematic diagram of the rotating component of FIG. 5.

FIG. 6 is a schematic diagram of the rotating component of FIG. 5. Referring to FIG. 6, the rotating component 130 includes a locking part 134 located on the side of the convex component 131, the locking part 134 is located next to one of the rotation axes 135. The locking part 134 is, for example, an arc-shaped structure protruding from the side of the convex component 131, but the form of the locking part 134 is not limited thereto.

Figure 7:
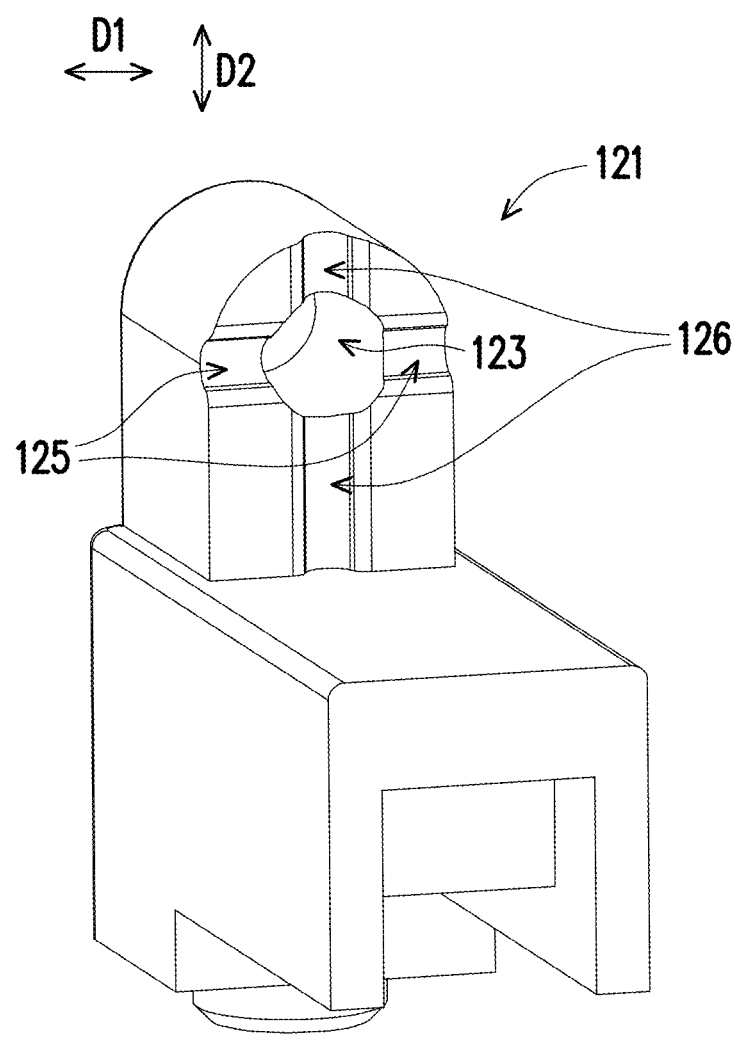
FIG. 7 is a schematic diagram of the first base of FIG. 5.

FIG. 7 is a schematic diagram of the first base of FIG. 5. Referring to FIG. 7, the fixed base 120 includes two positioning parts 125, 126. In the embodiment, the two positioning parts 125, 126 are located in the first base 121. The two positioning parts 125, 126 extend radially from the pivot hole 123 of the first base 121, and two extending directions D1, D2 of the two positioning parts 125, 126 are perpendicular to each other. In the embodiment, the two positioning parts 125 and 126 both present a cross shape through the rotation axis 135, but the positions and forms of the two positioning parts 125 and 126 are not limited thereto.

In the embodiment, the locking part 134 (as shown in FIG. 6) is optionally located at one of the two positioning parts 125, 126, so that the rotating component 130 stays at the plug-in position P1 or the heat dissipation position P2 relative to the fixed base 120.

Returning to FIG. 5, in the embodiment, an elastic member 124 is disposed in the pivot hole 123 of the second base 122 pushes against the corresponding rotation axis 135, so that there is a gap I between the convex component 131 and the second base 122. The gap I provides space for the convex component 131 to move towards the second base 122, so that the locking part 134 of the rotating component 130 can rotate between the two positioning parts 125, 126 (FIG. 7) of the first base 121. When the convex component 131 moves toward the second base 122, the elastic member 124 is compressed and accumulates elastic force. When the locking part 134 is positioned to one of the two positioning parts 125, 126, the elastic member 124 releases its elastic force, and the rotating component 130 can be positioned again.

In summary, the fixed base of the heat dissipation module of the present invention is adapted for being fixed to the circuit board. The rotating component is pivoted on the fixed base. The alignment member of the heat dissipating device of the heat dissipation module is detachably inserted into the rotating component, so that the heat dissipation body of the heat dissipating device rotates with the rotating component relative to the fixed base. Since the alignment member is inserted into the rotating component, the alignment is completed. And the alignment member is flipped, the installation is completed. Therefore, it is quite easy to assemble. Since no tools are required, the convenience of disassembly and assembly is greatly increased.

What is claimed is:

1. A heat dissipation module, adapted for being installed on a circuit board, the heat dissipation module comprises:
   a fixed base, one end is adapted for being fixed to the circuit board, and the other end has a rotating component, the rotating component is pivoted on the fixed base along a rotation axis; and
   a heat dissipating device, comprises a heat dissipation body and an alignment member extending from the heat dissipation body, and the alignment member is adapted to be detachably connected to the rotating component,
   wherein when the heat dissipation device is connected to the rotating component through the alignment member, the heat dissipation body is adapted to flip relative to the fixed base along the rotating axis,
   wherein the alignment member and the rotating component are connected by a concave component and a convex component,
   wherein the rotating component is the convex component, the alignment member is the concave component, and the convex component is limited by the concave component to limit the movement of the alignment member relative to the rotating component on a first axis,
   wherein the convex component has a protrusion, the concave component has a groove, and the cooperation of the protrusion and the groove is used to limit the movement of the alignment member relative to the rotating component on a second axis, wherein the second axis is perpendicular to the first axis.

2. The heat dissipation module according to claim 1, wherein the protrusion protrudes from the convex component, the concave component comprises two tongue pieces arranged in parallel, and the groove is formed on one of the two tongue pieces.

3. The heat dissipation module according to claim 2, wherein the tongue piece having the groove further comprises a tapered groove, the tapered groove is indented on the edge of the tongue piece away from the heat dissipation body, the tapered groove is connected to the groove, the minimum width of the tapered groove is equal to the width of the groove.

4. The heat dissipation module according to claim 1, wherein the rotating component comprises a first magnetic component, the heat dissipating device comprises a second magnetic component corresponding to the first magnetic component.

5. The heat dissipation module according to claim 1, wherein the rotating component comprises a locking part, the fixed base comprises two positioning parts, the locking part is optionally aligned with one of the two positioning parts.

6. The heat dissipation module according to claim 5, wherein the fixed base comprises a first base and a second base fixed to each other, the rotation axis is pivotally connected to the first base and the second base, the two positioning parts are located in the first base, and an elastic member is disposed in the second base and pushes against the corresponding rotation axis, so that there is a gap between a first limiting member and the second base.

7. The heat dissipation module according to claim 6, wherein the two positioning parts extend radially from a pivot hole of the first base, and two extending directions of the two positioning parts are perpendicular to each other.

8. The heat dissipation module according to claim 5, wherein the circuit board comprises a slot, the fixed base is adjacent to the slot.

9. The heat dissipation module according to claim 5, wherein the alignment member is located at one end of the heat dissipating device.

* * * * *